G. W. JACKSON.
SCRAPER DEVICE FOR LOADING MACHINES.
APPLICATION FILED NOV. 2, 1914.
1,182,875.
Patented May 9, 1916.
2 SHEETS—SHEET 1.
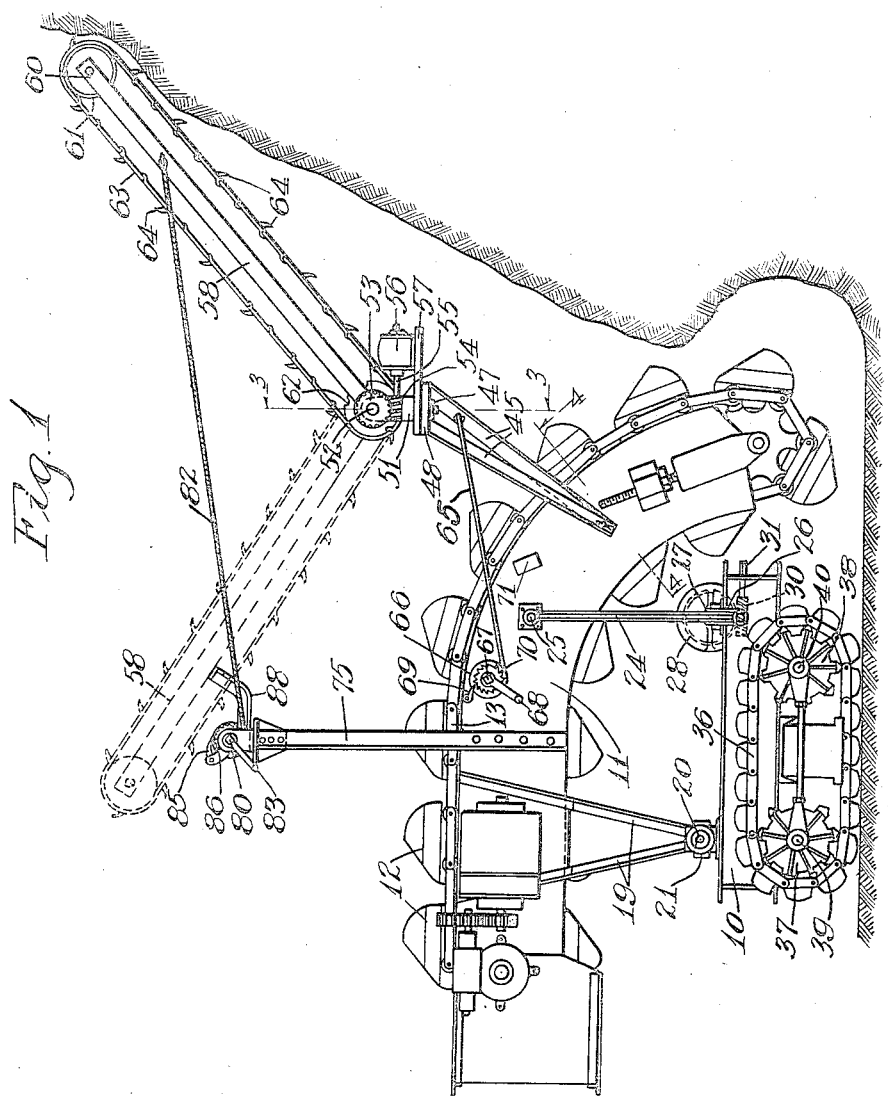

G. W. JACKSON.
SCRAPER DEVICE FOR LOADING MACHINES.
APPLICATION FILED NOV. 2, 1914.
1,182,875.
Patented May 9, 1916.
2 SHEETS—SHEET 2.
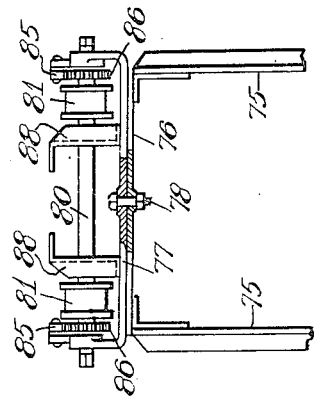
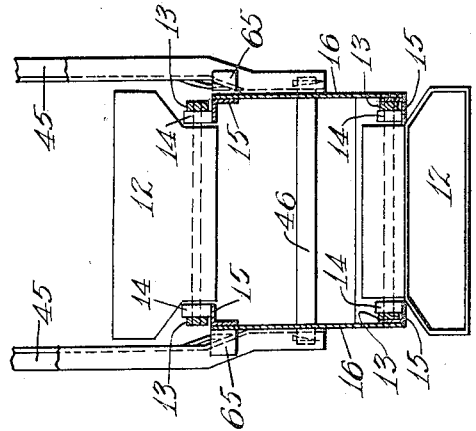
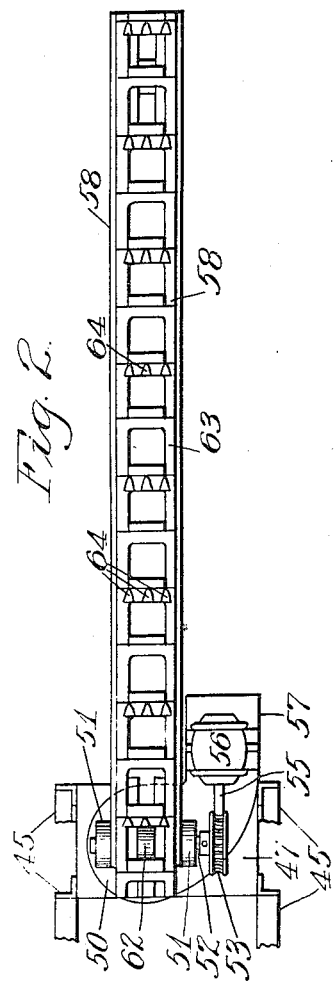
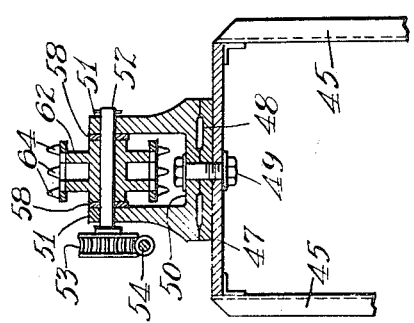
Inventor.
George W. Jackson.
by Parker & Carter
his Attys.

UNITED STATES PATENT OFFICE.

GEORGE W. JACKSON, OF CHICAGO, ILLINOIS.

SCRAPER DEVICE FOR LOADING-MACHINES.

1,182,875.  Specification of Letters Patent.  Patented May 9, 1916.

Application filed November 2, 1914. Serial No. 869,754.

*To all whom it may concern:*

Be it known that I, GEORGE W. JACKSON, a citizen of the United States, residing at Chicago, in the county of Cook and State of Illinois, have invented a certain new and useful Improvement in Scraper Devices for Loading-Machines, of which the following is a specification.

This invention relates to improvements in loading machines for transferring a material from a pile or body of such material to a vehicle or other suitable place for the disposal thereof; and the invention relates more specifically to a novel scraper attachment applied to such loading machine for loosening the material of the pile above the receiving end of the machine and for scraping or drawing the material toward the buckets at the receiving end of the machine.

The invention consists in the matters hereinafter set forth and more particularly pointed out in the appended claims.

The loading machine to which my invention is adaptable may comprise a suitable boom which carries an endless series of traveling buckets, said boom being supported on a wheeled frame or platform by which the receiving end of the boom and buckets are directed toward the mass of material to be loaded. I have herein shown my invention as practically applied to a form of loading mechanism, such as is shown in my pending application for U. S. Letters Patent, filed on the 19th day of April, 1912, Serial No. 691,900, but it will be understood that my invention may be applied to other forms of loading mechanisms to produce the results desired. It has been found in practice that with certain kinds of material to be thus handled by such a loading machine, it does not freely fall toward the traveling buckets at the loading or the receiving end of the machine as the material is carried away from the bottom of the mass or pile, but tends to cake or solidify so as to require the body of the material above the area which is attacked by the buckets to be in some auxiliary way broken down so as to fall toward the buckets. Heretofore it has been the usual practice to break the mass down by manual labor, as for instance, a suitable number of operatives equipped with picks or like implements.

It is the object of the present invention to provide an improved attachment for a loading machine for the purpose described arranged to automatically and mechanically scrape the material of the mass or pile from the upper part thereof to the zone of attack by the buckets, so as to thereby save manual labor for this purpose.

In the drawings;—Figure 1 is a side elevation of a loading machine equipped with my improved scraping device. Fig. 2 is a plan view of the principal part of the scraping attachment. Fig. 3 is a tranverse section on the line 3—3 of Fig. 1. Fig. 4 is a transverse section on the line 4—4 of Fig. 1 Fig. 5 is a detail of the scraper supporting device.

As shown in the drawings, 10 designates, as a whole, a platform which carries a boom 11 upon which travels an endless series of buckets 12, 12; said buckets being connected in any suitable manner to the chains or conveyers 13, 13 which have incorporated therein the rollers 14 that travel on the track flanges 15, 15 of the side members 16 of the boom. The said boom is supported on the platform at the rear end of means of the rear supporting side frames 19 which are attached at the upper ends thereof to the boom in any suitable manner and are pivoted at their lower ends to horizontal pivots 20 that are suitably mounted in bearings 21 which rise from the rear part of said platform or frame. The forward end of the boom is supported on the platform by means of the standards 24 which are pivoted at their upper ends to said boom through the medium of the transverse shaft 25 and are connected to their lower ends to the cranks 26 at the sides of the platform formed on or carried by a transverse horizontal, rotative shaft 27. Said shaft is suitably mounted in bearings on the platform and is provided with a worm wheel 28 which meshes with a worm 30 formed on or carried by a horizontal, forwardly extending shaft 31 mounted in suitable bearings on the platform. The shaft 31 may be rotated by any suitable mechanism, as for instance, a crank applied to the squared end of the shaft; and when said shaft is turned or rotated the forward end of the boom is raised or lowered about the pivots 20. The said platform is herein shown as supported upon and is advanced and retracted, and otherwise controlled in its movement, through the medium of a caterpillar drive, consisting of the sprocket belts 36 at the sides of the machine which are trained about the sprocket wheels 37, 38 on the front and rear shafts 39, 40. This feature of the machine constitutes, in itself, no part of the present invention, and is fully shown and described in my aforementioned co-pending application for U. S. Letters Patent.

The scraping device comprising my present invention, and which may be applied to the loading machine herein shown, or to machines for like purposes of other types, is herein shown as made as follows: 45, 45 designate the side members of a pivoted carrying frame, which members are arranged one at each side of the boom and pivoted at their lower ends to a transverse shaft 46 which extends through and is carried by the boom at the forward end thereof. The said side frame members are connected at their upper ends by a transverse member 47 which supports a fixed plate 48 that is provided with a bearing opening to receive a central bearing shaft or king pin 49 of a turn table 50 which is mounted to rotate on said plate 47. The said turn table 50 is provided at its sides with upwardly extending lugs or arms 51 which are provided with alined bearing openings to receive a shaft 52. Said shaft 52 carries at one end a worm wheel 53 which meshes with a worm 54 formed on the shaft 55 of a motor 56. This motor is carried by a platform 57 which may be made integral with or carried by the turn table 50. 58, 58 designate the swinging side members of a scraper frame that are pivoted on said transverse shaft 52 and carry at their outer ends a second transverse shaft 60 provided with a sprocket wheel 61. Trained about said sprocket wheel 61 at the outer end of said frame and another sprocket wheel 62 on the shaft 52 is a wide sprocket or chain belt 63, certain of the links of which are provided with fingers 64 which constitute the scraping elements of the scraper devices. By reason of the fact that the motor for driving the scraping device is mounted on the turn table which carries the shaft 52, through which power is communicated to the scraper belt or chain, the said scraper frame may be swung about the axis of said shaft 52, and the turntable may be swung about its rotative axis or the king bolt 49 without disturbing the driving connections between the motor and the scraping chain or carrier. The said pivoted frame carried by the boom is arranged to swing forwardly and rearwardly from the vertical plane of its pivotal axis 46. This movement may be controlled and the forward movement limited by cables 65 that are suitably connected at their forward ends to the upper end of the carrying frame and are wound at their rear ends about drums 66 mounted on a transverse shaft 67 that is rotatively mounted in any suitable manner in the boom about midway of its length. The said drum shaft may be rotated through the medium of a crank 68 to wind the cables thereon and pay them out therefrom, and thereby raise and lower the carrying frame. The drum carrying shaft may be locked from rotation to hold the frame in a given position by means of a click 69 that engages a ratchet wheel 70 on said shaft 67. The rearward limit of swinging movement of the carrying frame may be limited by stop blocks 71 attached to and extending laterally from the boom.

The scraper frame itself is adapted to be raised and lowered and to be held at a given elevation by means made as follows: Attached fixedly to and extending upwardly from the boom slightly in rear of its midlength is a frame consisting of side members 75, 75 which are connected at their upper ends by a transverse member 76. 77 designates a horizontally rotative bearing frame which is provided with a central, downwardly extending pin or stud 78 that has rotative bearing in a suitable opening in said cross piece 76. 80 designates a shaft that is rotatively mounted in said bearing frame and carries at its ends drums 81, 81 that are connected by cables, 82, 82 to the forward upper end of said scraper frame. Said shaft 80 is rotated by a crank or cranks 83 and is locked from movement by clicks 85 on the frame which engage ratchet wheels 86 on the shaft 80. The cables and winding drums enable the scraper frame to be raised and lowered at will and to be held at any desired elevation when the scraper device is not resting on the breast of the pile of material. The rotative arrangement of the bearing frame 77 for the drum shaft also permits the scraper frame to be swung at any desired angle relatively to both the vertical and horizontal planes of the boom.

The loose or pivotal connection of the scraper carrier with its support, due to the pivoting of the scraper frame on the shaft 52 and the rotation of the turntable about the axis of the pin 49, enables the scraper to be adjusted to the pile of material in front of the loading device, at whatever angle the face or breast of the pile immediately above the boom may be presented, and also permits the scraper device to be given a free lateral sweep or swing relatively to the position of the boom at any given time, so as to scrape or pull the material from all parts of the breast of the pile toward the loading end of the boom. Thus, when an opening has been cut or dug out centrally of the breast of the pile a distance inwardly from said breast, a large part of the material of the pile at the sides of said opening may be drawn down toward the receiving end of the boom by the scraper device, without the necessity of swinging the boom laterally from side to side. In this manner the material may be loaded on the buckets of the boom with a less extent of movement of the boom than otherwise. The material will be directed properly to the loading end of the boom without necessitating manual labor for scraping such material from the upper part of the pile. The said scraper frame may be handled to swing the outer end thereof from side to side relatively to the boom, either by manual power or by means of cables or ropes attached to the outer end of the scraper frame and carried rearwardly therefrom for manual or mechanical control.

When the scraper device is not to be used, it may be thrown backwardly over the boom by any suitable means to the dotted line position shown in Fig. 1. In this position the frame is supported by brackets 88 which rise from and are supported by the drum shaft carrying frame. The supporting frame members 45 will be fitted to their pivots by means to permit the device to be readily detached therefrom when there is no occasion for its use.

It will be understood that the scraper carrying or supporting frame may be attached to other parts of the machine which will permit of the operative adjustment required; and further that the structural details of the device are capable of considerable variation within the spirit and scope of the invention.

I claim as my invention:—

1. The combination with a loading machine, embracing a swingable boom and an endless series of buckets supported thereon, with means for driving the same, a support pivotally mounted on the boom, a turntable on said support, a scraper device pivotally mounted on said turntable and means for driving said scraper device.

2. The combination with a loading machine, embracing a swingable boom and a conveyer device supported thereon, a support pivotally mounted on the boom to swing from front to rear of the boom, a stop on the boom to limit the rearward movement of the support, a turn-table mounted on said support, a scraper device extending forwardly from and pivoted to said turn-table to swing vertically and a motor mounted on the turn-table to operate said scraper device.

3. The combination with a loading machine, embracing a boom and a conveyer device supported thereon, of a scraper device pivotally supported on the boom to swing vertically and horizontally relatively thereto, a drum carried by the boom, a cable connecting said drum and the outer end of the scraper device, and means for rotating said drum and for locking it from retractive rotation, the support for said drum being horizontally swingable, for the purpose set forth.

4. The combination with a loading machine, embracing a boom and a conveyer device supported thereon, of a scraper device supported on the boom to swing vertically and horizontally relatively thereto, a rotative shaft provided with drums, cables wound upon said drums and connected to the outer end of said scraper device, a bearing for said shaft carried by and horizontally rotative on said boom and means for rotating the shaft to raise and lower the scraper device and for locking the shaft from retractive rotation.

In testimony whereof, I affix my signature in the presence of two witnesses this 28th day of October, 1914.

GEORGE W. JACKSON.

Witnesses:
  THOMAS C. JACKSON,
  MICHAEL MICHELSON.